May 21, 1968 R. J. RINK 3,384,382
FLEXIBLE AND CIRCUMFERENTIAL SEAL FOR ROTATING
SHAFTS AND THE LIKE
Filed Sept. 21, 1965
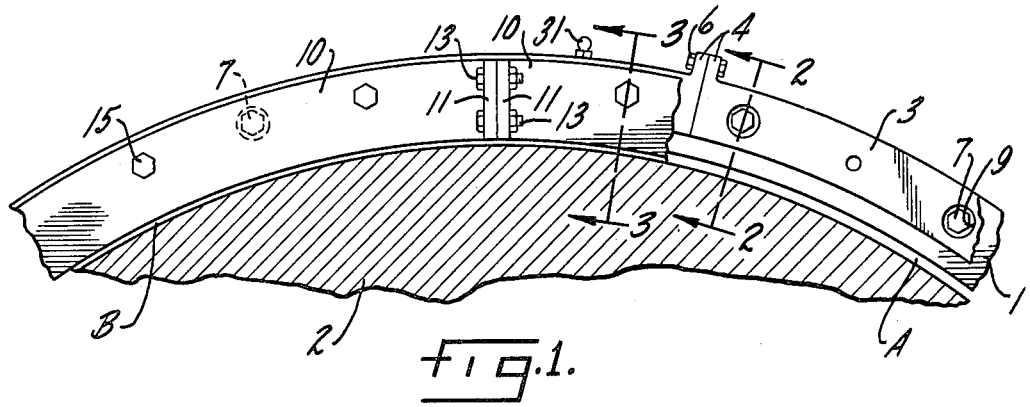
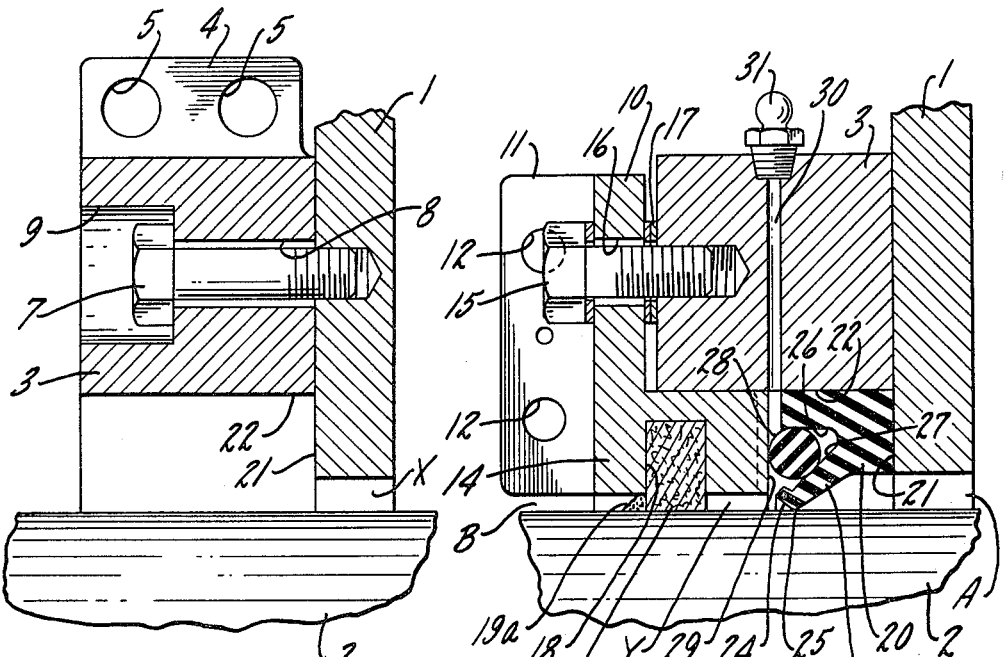
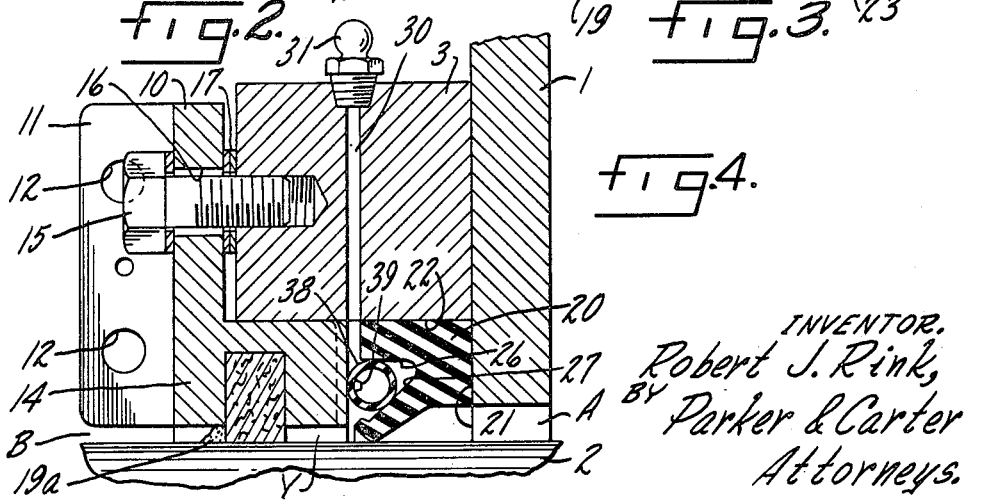
INVENTOR.
Robert J. Rink,
BY Parker & Carter
Attorneys.

United States Patent Office 3,384,382
Patented May 21, 1968

3,384,382
FLEXIBLE AND CIRCUMFERENTIAL SEAL FOR ROTATING SHAFTS AND THE LIKE
Robert J. Rink, West Allis, Wis., assignor to Nordberg Manufacturing Company, Milwaukee, Wis., a corporation of Wisconsin
Filed Sept. 21, 1965, Ser. No. 488,865
4 Claims. (Cl. 277—59)

ABSTRACT OF THE DISCLOSURE

The present invention relates to a seal particularly adapted for rotating shafts which rotate in areas where outside dirt or dust are present. It has for a primary purpose to provide a flexible, circumferential lip which is flexed into sealing contact with a rotated shaft by the employment of a circumferential ring subjected to fluid pressure.

---

The invention relates to an improvement in seals and has for one purpose to provide an efficient seal for rotating parts such as shafts, trunnions, and the like.

Another purpose is to provide a seal which is effective for use with the trunnions of a grinding mill.

Another purpose is to provide a seal which is easily accessible and easily mounted and demounted.

Another purpose is to provide such a seal in which an advantageous fluid pressure may be obtained whereby a flexible circumferential seal member is kept in effective sealing contact with a rotating shaft, trunnion, or the like.

Another purpose is to provide improved means for maintaining a supply of grease or the like for such a seal.

Another purpose is to provide improved adjusting means for such a seal.

Other purposes will appear from time to time in the course of the specification and claims.

I illustrate the invention more or less diagrammatically in the accompanying drawings wherein:

FIGURE 1 is a partial section through a trunnion which includes a partial elevation of a seal mechanism, with parts broken away;

FIGURE 2 is a section, on an enlarged scale, taken on the line 2—2 of FIGURE 1;

FIGURE 3 is a section, on an enlarged scale, taken on the line 3—3 of FIGURE 1; and FIGURE 4 is a section through a variant form.

Like parts are indicated by like symbols throughout the specification and drawings.

Referring to the drawings, 1 generally indicates a housing or wall portion which may, for example, form part of a bearing assembly. 2 generally indicates a rotating part which may, for example, be a mill trunnion. 3 is a segmented ring, the individual segments of which may be secured together, for example, by outwardly extending ears or lugs 4 apertured, as at 5, to receive suitable securing means 6, such as nuts and bolts. The individual segments 3 may be secured to the member 1, for example, by hex headed cap screws 7 which pass through apertures 8 in the segments 3, there being adequate clarance, as shown in FIGURE 2, for adjustment. The heads of the screws 7 are received in socket access apertures 9 in the segments 3. It will be noted that there is ample clearance between the rotating part 2 and the housing 1, as indicated at X in FIGURE 2. The distance between the inner surface of the segments 3 and the exterior of the rotating part 2 is substantially greater than the clearance X, to receive the below described seal parts.

Seal ring segments 10 are indicated, for example, in FIGURE 3, with outwardly extending ears 11 apertured, as at 12, to receive securing bolts or members 13, as shown in FIGURE 1. The segments 10 include a lower portion 14, the outer surface of which abuts the inner surface of the segments 3 and the inner surface of which surrounds the rotating part 2 with a clearance Y. The segments 10 are secured to the segments 3, for example, by cap screws 15 passing through clearance apertures 16 and provided with adjusting shims 17, the purpose of which will later appear. The inner surface of the ring portion 14 is apertured, as at 18, to receive a felt ring or wiper 19 shown as abutting the surface of the rotating member 2.

The ring segments 3 and 10, as will be clear from FIGURE 3, define a space into which a flexible wiping ring 20 of rubber, or a rubber-like substance, may be fitted. This ring has surfaces 21 and 22 which abut the opposing surfaces of the members 1 and 3, respectively. The ring further has a downwardly extending, inclined web or flange 23, shown as having a terminal lip 24 and preferably defining a relatively limited contact surface or edge, as at 25, which may bear against the exterior surface of the rotating member 2. There is a space defined between the web 23 and the upper part of the ring 20 between the upper surface 26 generally parallel with the outer surface of the rotating member 2 and the inclined surface 27 of the flange 23. In the space thus defined I position an O-ring or the like 28 which abuts the upper surface 26, the inclined lower surface 27, and the opposed right-hand surface 29 of the segments 10. The segments 10 are adjusted in relation to the segments 3 in such fashion that the surfaces 29 bear against the O-ring 28 and thereby flex the web or flange 23, and thus the contact edge 25 inwardly against the rotating member or trunnion 2. 30 indicates a grease passage, or passages, through one or more of the ring segments 3, through which grease may be forced, under suitable pressure, into the space about the O-ring 28. The grease may pass about this ring through suitable channeling of the surface 29 and may fill the space between the web 23 and the felt ring 19. Actually, in practice, it is advantageous to have the grease flow through or past the felt ring 19, to form an exterior grease deposit to the left of the ring 19, referring to the position of the parts as shown in FIGURE 3. 31 is any suitable closure for the grease passage 30, the details of which do not of themselves form part of the present invention.

It will be understood, referring to the position of the parts as shown in FIGURE 3, that the interior, or the oil or lubricant space of the assembly, is at A, and that the exterior space, from which dirt might enter, is at B. The space A may be considered the lubricated side, and the space B the exterior side of the seal assembly.

It will be realized that, when the segments 10 are drawn to the right against the segments 3 by the screws 15 as far as the shims 17 will permit, the rubber or rubber-like O-ring 28 will be subjected to pressure, and, in turn, will flex the web 23 and the contacting edge 25 inwardly against the exterior surface of the rotated part or trunnion 2. Grease under pressure may be applied as needed, and the space between the O-ring 28 and the felt seal ring 19 may be kept constantly filled with grease. This grease, and the part of the grease body which may form to the left of the felt ring 19, constitutes a barrier to dirt, grit, or the like, present in the outside space B. It will be prevented from entering the grease body area and the lubricant in the inner space A is thereby protected from foreign material, grit, or the like.

The ring formed by the segments 3 may be adjusted to proper concentric position, owing to the clearance between the screws 7 and the bore or aperture 8 of FIGURE 2. The ring formed by the segments 10 is in telescopic relation with the ring formed by the segments 3, and is adjustable therewith. The pressure of the surface 27 against the O-ring 28 can be adjusted by varying the number of shims employed. As it is desired to move the segments 10 inwardly toward the O-ring 28 one or more of the shims 17 may be removed from the position in which they are shown in FIGURE 1 and may, if necessary, be replaced against the hex head of the screws 15 on the opposite side of the segments 10. Thus a very simple sealing structure is provided which can readily be adjusted and which provides a highly efficient sealing protection for a lubricated space. The pressure of the grease will cause the lip of the web or flange 23 to press against the rotating shaft. Grease from the space thus provided will not easily move into the space A behind the seal, which is reserved for oil. Thus, the combination of the grease under pressure, and the lip or contacting area 25, presents a formidable barrier to oil escaping to the left of the lip 25. The felt ring 19 will merely bear against the outer surface of the rotating shaft or trunnion 2, and grease will not have any difficulty in moving under the felt to build up an exterior grease barrier, indicated at 19a. Thus the entry of dirt into the grease chamber thus provided will be effectively blocked.

The entire seal structure can be easily assembled and disassembled and adjusted to a proper concentric position.

With reference to the form of FIGURE 4, the only indicated difference is the substitution for the solid ring 28 of a hollow inflatable ring 38. This ring, which may be made of rubber or a suitable rubber substitute, is indicated as having any suitable filler or check valve 39, the details of which do not of themselves form part of the present invention. It will be understood that the ring 38 may be inflated with any suitable fluid, taking air and grease as two possible examples. The filler unit 39 will permit the admission of the fluid to any desired reasonable pressure, and will prevent the escape of the fluid, thereby maintaining the fluid under a predetermined initial pressure. The ring may be distensible, to permit, if desired, an increase of diameter in response to an increase in pressure. The hollow ring is abutted by the ring segments 10, which may be adjusted by the shims 17 to any desired position in relation to the ring 38.

It will be realized that whereas I have described and shown a practical and operative device, nevertheless many changes may be made in size, shape, number and disposition of parts. I therefore wish my description and drawings to be taken as in a broad sense illustrative or diagrammatic rather than as limiting me to my precise showing herein.

I claim:

1. In a sealing assembly for relatively rotating parts, a bearing housing including a wall member extending circumferentially about and spaced outwardly from a rotating part, a first ring, means for securing said first ring to said wall member, said first ring extending axially from the wall member along the rotating part and having an inner diameter greater than the inner diameter of said wall member, a second ring secured to the first ring and including an inner annular portion extending axially in telescopic relation with said first ring between said first ring and said rotating part, means mounting said second ring in spaced apart relation to the rotating part and with the telescoped end of the inner annular portion thereof in axially spaced relation to the housing wall, said rings and housing wall defining an annular space extending circumferentially about the rotating part, a seal ring seated in said space and being formed of flexible nonmetallic material, said seal ring including an inwardly inclined annular lip portion joined to said seal ring at a point spaced radially outwardly of said rotating part and said lip having an annular edge portion contacting the exterior surface of said rotating part, a flexible ring surrounding and engaging said lip with said telescoped end of said second ring engaging said flexible ring, means for urging the second ring axially toward the wall member whereby to urge said flexible ring against said lip to press said lip against the rotating part and duct means in one of said first and second rings for directing grease under pressure into the space about said flexible ring.

2. The structure of claim 1 characterized by and including additional sealing means carried by the second ring and surrounding said rotating part and having an annular inner surface abutting the outer surface of the rotating part and defining with the flexible lip an annular space about the rotating part adapted to receive grease from said duct means.

3. The structure of claim 1 characterized in that the means for securing the first ring to the wall member includes means for adjusting said ring radially and circumferentially in relation to the rotating part.

4. The structure of claim 1 characterized in that the means for securing the second ring to the first ring includes means for adjusting the second ring axially along the rotating part.

References Cited

UNITED STATES PATENTS

| | | | |
|---|---|---|---|
| 1,068,329 | 7/1913 | Derihon | 277—152 X |
| 1,356,393 | 10/1920 | Nolte | 277—226 X |
| 1,428,238 | 9/1922 | Keating. | |
| 2,273,129 | 2/1942 | Messinger | 277—59 |
| 2,352,947 | 7/1944 | Dunbar | 277—59 X |
| 2,509,151 | 5/1950 | Kasten | 277—205 |
| 2,814,517 | 11/1957 | Razdon | 277—226 |
| 3,047,300 | 7/1962 | Taylor et al. | 277—177 X |
| 3,057,630 | 10/1962 | Sneed | 277—165 |
| 3,294,243 | 12/1966 | Cerles | 277—34.3 X |

FOREIGN PATENTS

| | | |
|---|---|---|
| 724,638 | 7/1942 | Germany. |
| 8,181 | 1911 | Great Britain. |

LAVERNE D. GEIGER, *Primary Examiner.*

J. S. MEDNICK, *Assistant Examiner.*